US009779742B2

(12) United States Patent
Newsome, Jr.

(10) Patent No.: US 9,779,742 B2
(45) Date of Patent: Oct. 3, 2017

(54) DEVICE PAIRING WITH AUDIO FINGERPRINT ENCODINGS

(71) Applicant: Robert Bosch GmbH, Stuttgart (DE)

(72) Inventor: James Duran Newsome, Jr., Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 855 days.

(21) Appl. No.: 13/803,431

(22) Filed: Mar. 14, 2013

(65) Prior Publication Data

US 2013/0242706 A1    Sep. 19, 2013

Related U.S. Application Data

(60) Provisional application No. 61/610,852, filed on Mar. 14, 2012.

(51) Int. Cl.

| | |
|---|---|
| *G10K 11/00* | (2006.01) |
| *G10L 19/018* | (2013.01) |
| *G06F 21/44* | (2013.01) |
| *H04W 12/06* | (2009.01) |
| *H04L 9/08* | (2006.01) |
| *H04L 9/32* | (2006.01) |
| *H04L 29/06* | (2006.01) |

(52) U.S. Cl.
CPC .......... *G10L 19/018* (2013.01); *G06F 21/445* (2013.01); *H04L 9/0844* (2013.01); *H04L 9/3231* (2013.01); *H04L 63/0861* (2013.01); *H04W 12/06* (2013.01); *H04L 63/18* (2013.01); *H04L 2209/80* (2013.01)

(58) Field of Classification Search
CPC ........ G08B 19/00; G08B 1/00; G08B 25/003; G08B 25/014; G08B 26/00; H04B 11/00

USPC ......... 367/197; 370/278, 329, 341, 352, 428
See application file for complete search history.

(56) References Cited

U.S. PATENT DOCUMENTS

| | | | | |
|---|---|---|---|---|
| 5,127,004 | A | * | 6/1992 | Lenihan et al. ............... 370/525 |
| 5,636,325 | A | * | 6/1997 | Farrett .......................... 704/258 |
| 6,292,437 | B1 | * | 9/2001 | Beard ........................... 367/197 |
| 6,737,957 | B1 | * | 5/2004 | Petrovic et al. ............. 340/5.86 |
| 7,370,200 | B2 | | 5/2008 | Kindberg et al. |
| 7,711,564 | B2 | * | 5/2010 | Levy et al. ................... 704/270 |
| 2001/0037196 | A1 | * | 11/2001 | Iwamoto ....................... 704/207 |
| 2003/0065918 | A1 | * | 4/2003 | Willey ........................... 713/168 |

(Continued)

OTHER PUBLICATIONS

Kumar et al., "A comparative study of secure device pairing methods," Pervasive and Mobile Computing; 2009; pp. 734-749; No. 5; Elsevier Publishing; USA (16 pages).

(Continued)

*Primary Examiner* — Emily C Terrell
(74) *Attorney, Agent, or Firm* — Maginot Moore & Beck LLP

(57) ABSTRACT

A device and/or method for allowing authorization of computing device association using human-perceptible signals includes forming an association between a computing device and a further computing device. The computing device computes a fingerprint of a common key derived during the forming of the association and emits a first audio stimuli based upon the computed fingerprint. The first audio stimuli is at least one octave number apart from a second audio stimuli of the further computing device emitted by the further computing device based upon the common key.

20 Claims, 3 Drawing Sheets

(56) References Cited

U.S. PATENT DOCUMENTS

2003/0133423 A1* 7/2003 LaDue .................... 370/330
2008/0162133 A1* 7/2008 Couper et al. ............. 704/239
2012/0072730 A1* 3/2012 Winograd et al. ......... 713/176

OTHER PUBLICATIONS

Li et al., "Group Device Pairing based Secure Sensor Association and Key Management for Body Area Networks", INFOCOM, 2010 Proceedings IEEE, pp. 1-9; (9 pages).

Malkani et al., "PSIM: A Tool for Analysis of Device Pairing Methods", International Journal of Network Security & Its Applications; Oct. 2009; pp. 39-50; vol. 1, No. 3; United Kingdom (12 pages).

Tsudik, "Secure Device Pairing", University of California, USA, published at least as early as Mar. 13, 2012 (50 pages).

Saxena et al., "Universal Device Pairing using an Auxiliary Device," Symposium on Usable Privacy and Security (SOUPS), Jul. 23-25, 2008, Pittsburgh, PA, USA (12 pages).

Soriente et al., "HAPADEP: Human-Assisted Pure Audio Device Pairing", University of California, USA, published at least as early as Mar. 13, 2012 (16 pages).

International Search Report and Written Opinion in corresponding PCT application (i.e., PCT/US2013/031653), mailed Jun. 21, 2013 (10 pages).

Core Specification Working Group, "Simple Pairing Whitepaper", Revision V10r00; Aug. 1, 2006 (23 pages).

Prasad et al., "Efficient Device Pairing Using 'Human-Comparable' Synchronized Audiovisual Patterns", Applied Cryptology and Network Security; Jan. 1, 2008; pp. 328-345; vol. 5037; Springer; Berlin Heidelberg (18 pages).

Suomalainen et al., "Security Associations in Personal Networks: A Comparative Analysis", Security and Privacy in Ad-Hoc and Sensor Networks; Jul. 2, 2008; pp. 43-57; Springer; Berlin Heidelberg (16 pages).

Kumar et al., "Caveat Emptor: A Comparative Study of Secure Device Pairing Methods," Pervasive Computing and Communications 2009, PERCOM 2009, IEEE International Conference on, IEEE, Piscataway, NJ, USA, Mar. 9, 2009, pp. 1-10, XP031453098, ISBN: 978-1-4244-3304-9 (10 pages).

Soriente et al., "HAPADEP: Human-Assisted Pure Audio Device Pairing," International Association for Cryptologic Research, vol. 20070322:141124, Mar. 13, 2007, pp. 1-11, XP061002273 (11 pages).

\* cited by examiner

DEVICE PAIRING WITH AUDIO FINGERPRINT ENCODINGS

This application claims the benefit of U.S. Provisional Application No. 61/610,852, filed Mar. 14, 2012.

FIELD OF THE INVENTION

The present disclosure relates to communication between computing devices and more particularly to authentication of such communication.

BACKGROUND

Personal computing devices, such as personal digital assistants (PDAs), multimedia players, cameras, smartphones, and headsets are becoming increasingly more prevalent and useful in everyday activities. For example, persons are more frequently carrying these computing devices on their person as they go about their daily activities. Often, such devices are most useful when they interact with other devices via some communication media, such as wireless communications. There are many common everyday scenarios in which two devices need to interact with one another. One common case is where both devices are controlled by a single user, such as where a user operates a Bluetooth headset and a cell phone to perform hands-free calling or where a user operates a PDA and a wireless printer to print documents remotely. Another case is where individual users initiate communication between their respective computing devices, such as where two users establish a connection between their respective PDAs to wirelessly share electronic data. Thus, an aspect of the increased usefulness in personal computing is spontaneous device association.

Spontaneous associations between computing devices are preferable given the often impromptu circumstances in which the user or users operate the devices, such as those circumstances exemplified above. In addition, because spontaneous interactions are likely to occur in untrustworthy environments, securing these interactions is important. An example of such an untrustworthy environment is the case in which two colleagues meet at a conference and transfer an electronic document containing sensitive business information from one colleague's PDA to the other colleague's laptop computer. If the transfer is performed wirelessly and in the absence of appropriate security measures, a third party, such as a business rival, could intercept the sensitive information. Thus, some degree of security is desired to prevent a third party from eavesdropping on a communication.

Traditional cryptographic means of establishing secure communication channels, such as authenticated key exchange protocols, are generally unsuitable for secure device pairing. These traditional cryptographic means are unsuitable because mutually unfamiliar devices have no prior context and no common point of trust: no on-line Trusted Third Party (TTP), no off-line Certification Authority (CA), no Public Key Infrastructure (PKI), and no common secrets. Although protocols exist to facilitate exchange of encryption keys between computing devices, security breaches may still result from the inability to establish secure, authenticated communication channels between the devices.

In one type of security breach known as Man-in-the-Middle (MiTM), two users attempt to communicate directly with each other. However, information intended to be exchanged between the users is instead intercepted by a third party. The third party emulates each user from the perspective of the other so that the two users are unaware of the presence of the third party.

Another type of security breach occurs in environments having multiple computing devices with spontaneous device association capability. In this security breach, a pair of devices attempts to associate with each other near in time to another pair of devices similarly attempting to associate with each other. It is possible that a member of each pair becomes mistakenly associated with a member of the other pair.

To address these security problems, some computing devices implement auxiliary or out-of-band (OOB) channels, which are both perceivable and manageable by the user or users who operate the devices. An OOB channel takes advantage of human sensory capabilities to authenticate human-imperceptible information exchanged over a wireless channel. The OOB channel is essentially a physically constrained channel, meaning that only devices in a certain physical context can transmit or receive a message via the channel. OOB channels are realized using human-perceptible senses such as audio, visual, and tactile.

Existing implementations of OOB channels suffer from a number of issues. For instance, because human involvement is required to authenticate an association, device usability must be simple and efficient to avoid deterring users from overly complex authentication methods. Moreover, because the OOB channel is typically a low bandwidth channel, the information transmitted to enable the authentication must be minimized. Also, many computing devices capable of forming associations have limited hardware facilities and/or user interfaces to support complex authentication methods.

Therefore, an improved authentication technique is needed that simplifies user authentication, efficiently transmits minimal information to enable the authentication, and utilizes universal and/or inexpensive and readily available hardware facilities and user interfaces.

SUMMARY

A computing device implements a method to allow authorization of computing device association using human-perceptible signals. The computing device includes a transmitter, a receiver, a user interface configured to emit a human perceptible stimuli, a memory in which command instructions are stored, and a processor operably connected to the transmitter, the receiver, the user interface, and the memory. The processor is configured to execute the command instructions to form an association with a second computing device using the transmitter and the receiver, compute a fingerprint of a common key derived during the association formation with the second computing device, and control the user interface to emit a first audio stimuli based upon the computed fingerprint. The first audio stimuli is at least one octave number apart from a second audio stimuli emitted by the second computing device based on the common key.

A method to allow authorization of computing device association using human-perceptible signals is provided. The method includes forming an association between a first computing device and a second computing device, computing with the first computing device a fingerprint of a common key derived during forming of the association, and emitting with the first computing device a first audio stimuli based upon the computed fingerprint. The first audio stimuli is at least one octave number apart from a second audio stimuli of the second computing device emitted by the second computing device based upon the common key.

DETAILED DESCRIPTION

Figure 1:
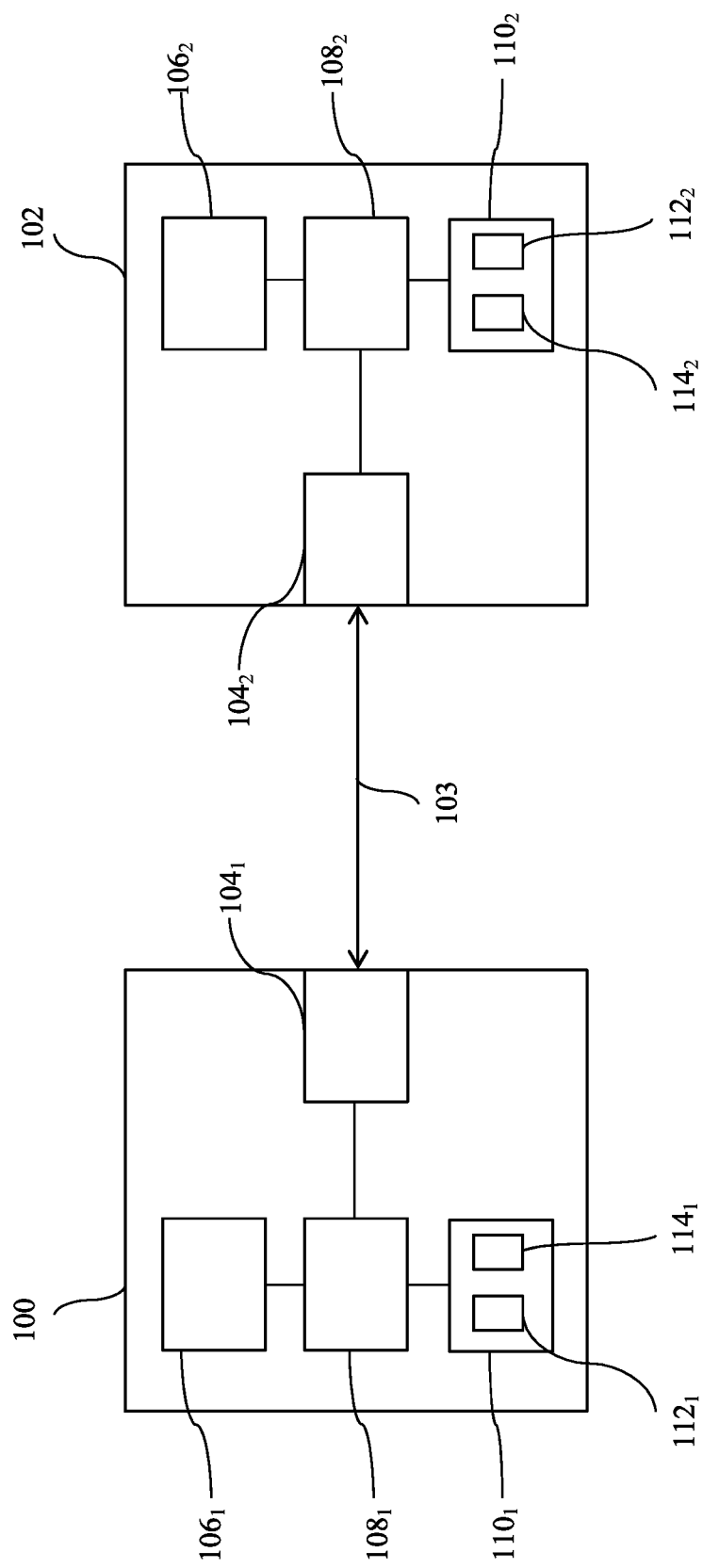
FIG. 1 depicts a pair of computing devices configured to form a secure association in accordance with an embodiment of the present disclosure.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIG. 1 illustrates a pair of computing devices 100/102 configured to form a secure association in accordance with an embodiment of the present disclosure. The devices 100/102 each include computing and communication capability. Examples of such devices are cellular telephones, personal digital assistants (PDAs), tablet computers, hand-held computers, web-enabled cellular telephones, Global Positioning Systems (GPS), security systems, and personal computers, such as laptops, or notebooks. Further examples include portable electronic game devices, digital cameras, digital displays, such as a digital picture frame that is capable of displaying images or video clips stored therein, computer-related peripherals (e.g., printers, scanners, monitors), point-of-purchase kiosks, and so forth.

As shown in FIG. 1, the devices 100/102 communicate with each other via a communication network 103. In some embodiments, the communication network 103 implements wireless communications, such as radio frequency or infrared communications. The wireless communications in some embodiments incorporate an IEEE 802.11 protocol, such as 802.11a, 802.11b, or 80211g, or another protocol which allows for broadcast messages.

Each device 100/102 also includes a transmitter and receiver $104_x$ for communicating via the network 103, an I/O device $106_x$, a processing circuit $108_x$ configured to control operation of the device 100/102, and a memory $110_x$. The I/O device $106_x$ in some embodiments includes a user interface, a graphical user interface, keyboards, pointing devices, remote and/or local communication links, displays, and other devices that allow externally generated information to be provided to the device 100/102, and that allow internal information of the device 100/102 to be communicated externally. In many of these embodiments, the I/O device $106_x$ includes at least one user interface that is configured to form human-perceptible stimuli. For example, such user interfaces include one or more of a speaker, a display screen, an LED, and the like.

The processing circuit $108_x$ in some embodiments is a general purpose computer processing circuit such as a microprocessor and its associated circuitry. The processing circuit $108_x$ is operable to carry out the operations attributed to it herein.

Within the memory $110_x$ are various program instructions $112_x$. The program instructions $112_x$, some of which are described more fully below, are executable by the processing circuit $108_x$ and/or any other components as appropriate. In some embodiments, the program instructions $112_1$ of device 100 are different than the program instructions $112_2$ of device 102. Similarly, in some embodiments, the transmitter and receiver $104_1$, I/O device $106_1$, processing circuit $108_1$, memory $110_1$, and other components enabling computing and communication capability in device 100 are different than the transmitter and receiver $104_2$, I/O device $106_2$, processing circuit $108_2$, memory $110_2$, and other computing and communication components in device 102.

In one embodiment, the devices 100/102 are each controlled by a different user. The users encounter each other in a variety of contexts in which it is desired for their respective devices to communicate with each other, either to receive information from the other user's device, to send information to the other user's device, or both. In other embodiments, a user with a device intends the device to communication with another device that is not actively controlled by a user, such as a wireless printer. In either case, before the information is sent, there must be a secure association between the devices to prevent an unauthorized third party from obtaining access to the information.

Figure 2:
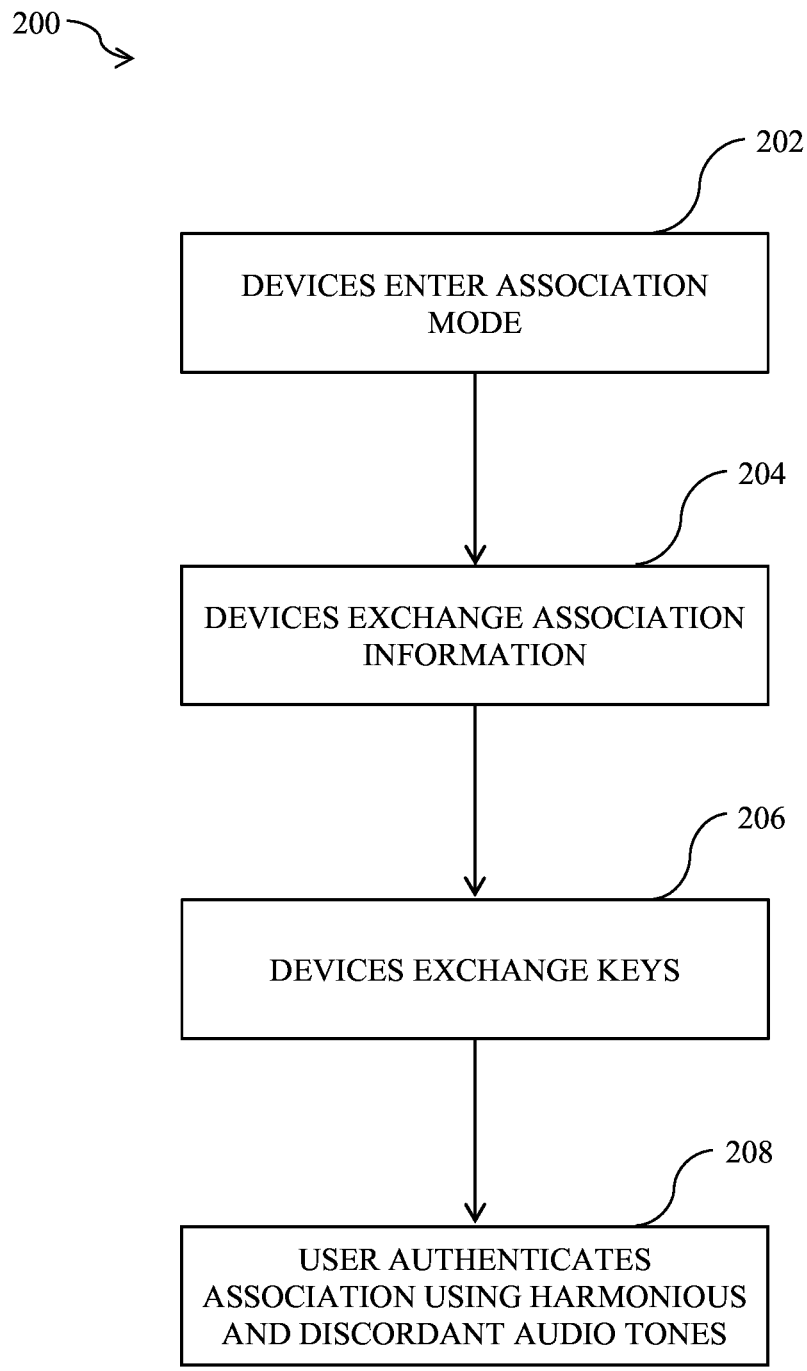
FIG. 2 depicts a flowchart of a method for forming a secure association of computing devices.

FIG. 2 illustrates a flowchart of a method 200 for forming a secure association of devices. The association method 200 is implemented, for example, by the processing circuits $108_x$ executing the program instructions $112_x$ stored in the memory $110_x$ in each of the devices 100/102. In block 202, the devices 100/102 enter into an association mode, enabling each of the devices 100/102 to broadcast its respective association information. In one embodiment, a user causes the devices 100/102 to enter into the association mode by physically operating a user interface, such as depressing a button, associated with the I/O device $106_x$. In another embodiment, one or more of the devices 100/102 enter into the association mode automatically, such as during certain time intervals during the day or when the one or more devices 100/102 are in the presence of a familiar or recognized wireless network.

In block 204, the devices 100/102 exchange association information, such as their respective network addresses. Each device 100/102 listens for association messages and correlates the messages in time to deduce the network address of the other device 100/102. Each device 100/102 then uses the network address of the other device 100/102 to address future messages to the other device 100/102. An example of a known protocol used to exchange network addresses is the SWAP-CA specification.

Once association information is exchanged (block 204), the devices 100/102 exchange encryption keys (block 206). The devices 100/102 in some embodiments exchange keys by each device 100/102 using its respective transmitter and receiver $104_x$ to exchange unsecured key information via the communication network 103. The processing circuits $108_x$ of each of the devices 100/102 implement respective program instructions $112_x$ to derive a common key for both devices 100/102 from the exchanged key information. For example, after the key exchange, one device 100/102 possesses key $K_1$ and the other device 100/102 possesses key $K_2$. In a preferred embodiment, the key exchange satisfies the so-called "unique key" property of certain known key exchange protocols, meaning that $K_1=K_2$ and that a MiTM has been prevented from establishing a common key for the two device 100/102.

An example of a known protocol that is used for the key exchange and that satisfies the unique key property is the Diffie-Hellman protocol, which allows two users to establish a common key over a public channel. This protocol involves independent selection of random numbers by the two users for generation of the keys. An eavesdropper who observes the Diffie-Hellman messages sent between the two users is unable to derive the common key. As noted above, however, an active attacker who is able to modify the Diffie-Hellman messages sent between the two users can cause each user to establish a common key with the attacker rather than with each other.

Once an association is established between the devices 100/102 (blocks 202-206), the association is authenticated (block 208). Authenticating the association ensures that the devices intended by the user(s) to be associated are the devices that have been associated and that the association is secure. One approach to authenticate an association between devices is for each device to compute a fingerprint (one-way-function) of the common key and verify that the fingerprints are identical using the OOB channel. In this approach, the computed fingerprint is a shortened sequence of data representing the common key. A user then either: (1) compares the fingerprints from each device and indicates whether they match, or (2) reads the fingerprint from one device and enters it into the other device, which then determines whether the fingerprints match.

Figure 3:
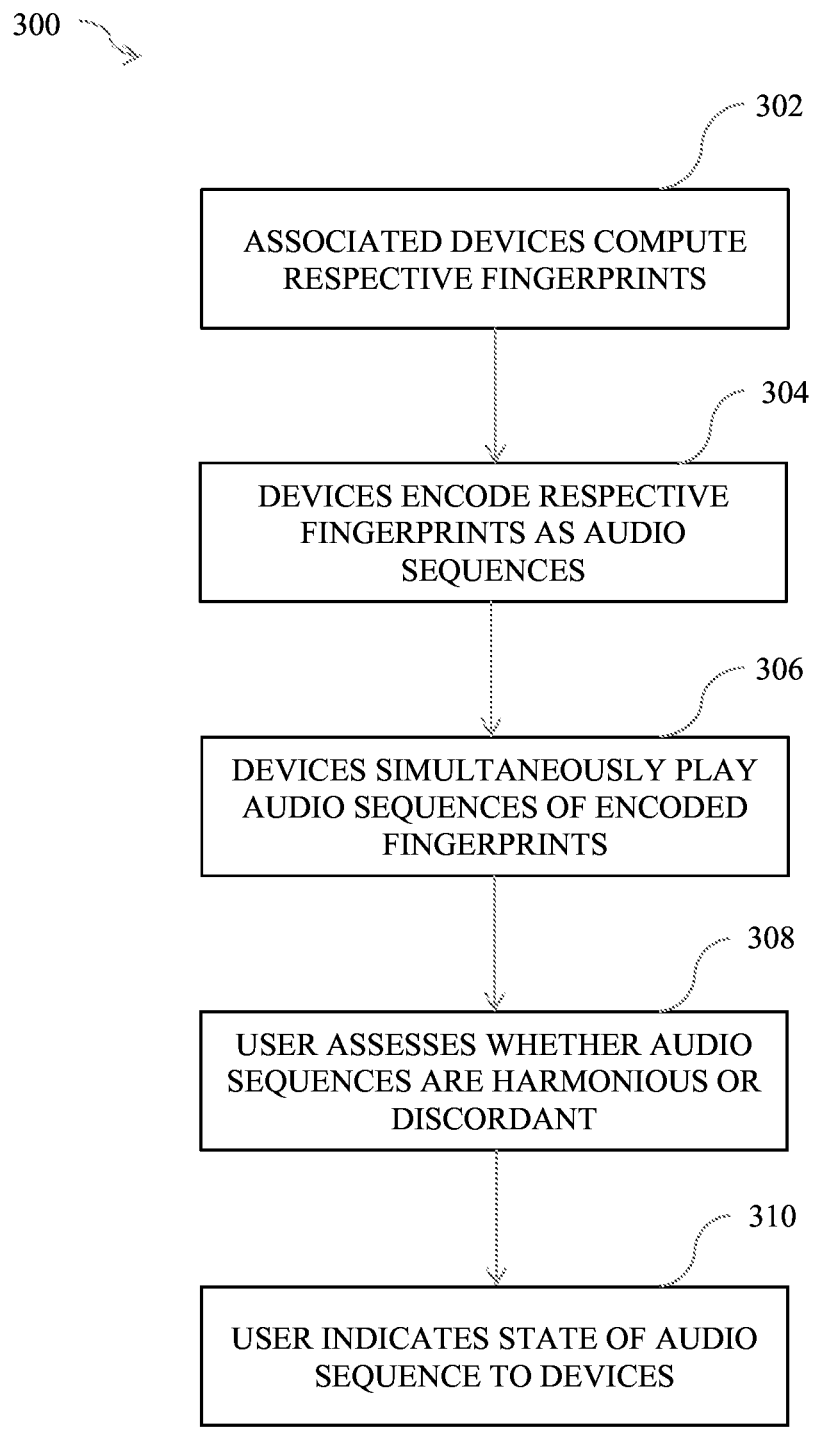
FIG. 3 depicts a flowchart of a method for authenticating a secure association of computing devices.

FIG. 3 depicts a flowchart of a method 300 for authenticating a secure association of computing devices using harmonious and/or discordant tones of an audio sequence. The authentication method 300 is preferably performed in block 208 of FIG. 2. In one embodiment, the processing circuits $108_x$ of each of the devices 100/102 implements the method 300 by executing the program instructions $112_x$ stored in the memory $110_x$ of each of the devices 100/102. In block 302, each of the devices 100/102 computes a fingerprint of the common key after the Diffie-Hellman exchange. For verified Diffie-Hellman, the fingerprints to be verified are large; at least sixty-four (64) bits and possibly as many as two-hundred-fifty-six (256) bits. In some embodiments, the size of the fingerprints result in unacceptably long data sequences, making it difficult for a user to efficiently compare the fingerprints and authenticate the association. In these embodiments, the fingerprints are truncated if a commitment scheme is used to prevent an attacker from finding a fingerprint collision while the protocol is running.

An example of such a commitment scheme is in the Bluetooth Secure Simple Pairing protocol. In this exemplary protocol, each user sends a full-sized, for example, two-hundred-fifty-six (256) bit, fingerprint of their public exponents to each other before sending their actual public exponents over the unauthenticated channel. The fingerprint of the established common key can be much smaller since an attacker would have already committed to a public exponent and, hence, be unable to actively seek a collision. Some form of commitment is important even if the fingerprint is large since a partial collision may be sufficient to fool the user. For example, ten (10) bit mismatches in a two-hundred-fifty-six (256) bit fingerprint may go unnoticed.

In block 304, each of the devices 100/102 uses an encoding function $f(X, V) \rightarrow M$ to encode its respective computed fingerprint as a sequence of audio signals. The encoding function $f(X, V) \rightarrow M$ in some embodiments is stored as program instructions $114_x$ in the memory $110_x$ that are executed by the respective processing circuits $108_x$ of each of the devices 100/102. The encoding function $f(X, V) \rightarrow M$ as implemented inputs both a bit-string (X) and a voice-string (V) and outputs a sequence of audio signals (M). The voice-string (V) is a predetermined audio signal to be mapped on each zero (0) bit or one (1) bit at each position of a given bit-string. After the audio signals are mapped onto the bit-string, each position along the bit-string has a "voice" that depends on whether the bit associated with that position is a zero (0) or a one (1). Exemplary mappings are discussed in more detail below. The encoding function is constructed such that for two bit-strings $X_1$ and $X_2$ encoded using two voice-strings $V_1$ and $V_2$, matching bits in $X_1$ and $X_2$ will result in output signals that sound harmonious when played together, and mismatched bits in $X_1$ and $X_2$ will result in output signals that sound discordant when played together.

The encoding function $f(X, V) \rightarrow M$ enables each of the devices 100/102 to encode their respective fingerprints as audio signals in a manner that is easy for the human ear to detect whether or not the playback of the encoded fingerprints indicates a fingerprint match. Encoding the fingerprint as a sequence of audio signals eliminates the requirement for a high resolution display or keyboard on the devices 100/102. Instead, the devices 100/102 need only a speaker, which is likely cheaper than a keyboard or display and which may already be present on the devices 100/102 for other purposes. In addition, the fingerprint can be compared without much conscious effort by the user who, after several pairings, will become accustomed to the synchronized audio sequence and may notice a mismatched sequence even if not fully paying attention.

In block 306, the devices 100/102 simultaneously play or emit the audio sequences of the encoded fingerprints using their respective I/O devices $106_x$. In some embodiments, the devices 100/102 synchronize playback of the audio sequences by exchanging timing information during prior information exchanges, such as the exchange of association information (FIG. 2, block 204) or the exchange of encryption key information (FIG. 2, block 206). The harmonious and/or discordant sounds resulting from the simultaneous audio playback of the encoded fingerprints are made possible by the audio signal mappings chosen as voice-strings and, more particularly, because of the characteristics of musical octaves.

In the chromatic scale, a musical octave is split into twelve (12) equal divisions, or semi-tones. The total number of semi-tones from note C0, or the absolute semi-tone number (AST), for a note is calculated using the formula AST=12*Y+Z. The absolute semi-tone number (AST) is taken with reference to C0, where "C" is the note identifier and "0" is the octave number, because C0 is typically considered the lowest note discernible to the trained human ear. The constant value twelve (12) in the formula is the total number of semi-tones in an octave. The value Y is the octave number of a given note. For example, Y for notes C0, D0, and E0 is zero (0) since these notes are in the zeroth octave, while Y for notes C4, D4, and E4 is four (4) since these notes are in the fourth octave, and so on. The value Z is the semi-tone position of a given note within an octave. For example, Z for note C4 is zero (0) since C is established as the starting note for each octave, while Z for note C4# is one (1) since C# is the first semi-tone in any octave, and Z for D4 is two (2) since D is the second semi-tone in any octave, and so on. The absolute semi-tone number (AST) for each note of the fourth octave is shown in the following table:

| Note | Semi-tones from C0 (AST) |
| --- | --- |
| C4 | 48 |
| C4# | 49 |

-continued

| Note | Semi-tones from C0 (AST) |
|---|---|
| D4 | 50 |
| D4# | 51 |
| E4 | 52 |
| F4 | 53 |
| F4# | 54 |
| G4 | 55 |
| G4# | 56 |
| A4 | 57 |
| A4# | 58 |
| B4 | 59 |
| C5 | 60 |

The note C5 is shown in the table to illustrate that C5 is twelve (12) semi-tones, or one (1) octave, from note C4.

When two notes are simultaneously played or emitted by the devices 100/102, the resulting sound is characterized by how many semi-tones lie between the two notes, which is called the interval. Depending on the interval between the notes, the resulting sound is harmonious (H) or discordant (D). In general terms, a harmony is a combination of notes that sounds pleasant to most people when played at the same time. Conversely, dissonance is a combination of notes that sounds harsh or unpleasant to most people when played simultaneously.

A zero (0) semi-tone interval between the simultaneously played notes is called unison and the resulting sound is harmonious, such as for two notes C4 and C4. A one (1) semi-tone interval between the notes is called a minor second and the resulting sound is discordant, such as for notes C4 and C4#. A four (4) semi-tone interval is called a major third and the resulting sound is harmonious, such as for notes C4 and E4. A six (6) semi-tone interval is called a tritone and the resulting sound is discordant, such as for notes C4 and F4#. A twelve (12) semi-tone interval is called an octave and the resulting sound is harmonious, such as for notes C4 and C5. Notes that are a full octave apart sound very similar to one another and the above characteristics hold when octaves are added to any given interval. For example, notes C4 and C5# represent a thirteen (13) semi-tone interval, which is a minor second plus an octave, and have a similar character to the discordant sound that results from a minor second.

An example encoding function for two devices $f(X_1, V_1) \rightarrow M_1$ and $f(X_2, V_2) \rightarrow M_2$ in which matching bits in $X_1$ and $X_2$ result in harmonious (H) notes and mismatching bits in $X_1$ and $X_2$ result in discordant (D) notes is when each zero (0) bit results in the note C4, and each one (1) bit results in the note C4#, for all voices. Applying the same bit mapping for all voices means both that corresponding bit-positions along each of the bit-strings have identical note mappings for the zero (0) and one (1) bits. Said another way, applying the same bit mapping for all voices means that $V_1=V_2$. In this example encoding function, matching bits will result in an interval of zero (0) semi-tones representing unison: either C4 with C4 or C4# with C4#. However, mismatching bits will result in an interval of one (1) semi-tone representing a minor second: C4 with C4#.

The following table illustrates the harmonious result of identical bit-strings being simultaneously played together:

| Bit-string 1 | 0 | 1 | 0 | 1 |
|---|---|---|---|---|
| Bit-string 2 | 0 | 1 | 0 | 1 |
| Voice-string 1 | C4 | C4# | C4 | C4# |
| Voice-string 2 | C4 | C4# | C4 | C4# |
| Interval | 0 (unison) | 0 (unison) | 0 (unison) | 0 (unison) |
| Harmonious/Discordant | H | H | H | H |

The following table illustrates the discordant result of completely mismatched bit-strings being simultaneously played together:

| Bit-string 1 | 0 | 1 | 0 | 1 |
|---|---|---|---|---|
| Bit-string 2 | 1 | 0 | 1 | 0 |
| Voice-string 1 | C4 | C4# | C4 | C4# |
| Voice-string 2 | C4# | C4 | C4# | C4 |
| Interval | 1 (minor 2nd) | 1 (minor 2nd) | 1 (minor 2nd) | 1 (minor 2nd) |
| Harmonious/Discordant | D | D | D | D |

The following table illustrates the mixed harmonious and discordant result of partially matching bit-strings being simultaneously played together:

| Bit-string 1 | 0 | 1 | 0 | 1 |
|---|---|---|---|---|
| Bit-string 2 | 0 | 0 | 0 | 0 |
| Voice-string 1 | C4 | C4# | C4 | C4# |
| Voice-string 2 | C4 | C4 | C4 | C4 |
| Interval | 0 (unison) | 1 (minor 2nd) | 0 (unison) | 1 (minor 2nd) |
| Harmonious/Discordant | H | D | H | D |

A similar encoding function is defined using a tritone rather than a minor second. For example, where a zero (0) bit maps to C4, and a one (1) bit maps to F4#. In this function, mismatched bits result in an interval of six (6), which is a tritone.

In block 308, a user assesses whether the resulting audio sequences are harmonious or discordant. A harmonious result indicates that the devices 100/102 successfully exchanged a common key and the device association is secure. A discordant result, however, indicates that the devices 100/102 failed to successfully exchange the common key due to tampering or other errors and that the device association is not secure. In a preferred embodiment, the user assesses the audio sequences for harmony or dissonance by listening to the audio output simultaneously emanating from the I/O device 106 of each device 100/102.

Since the user may have trouble noticing if only one or two bits of the encoded bit-strings differ, a pre-agreed upon one-way collision-resistant hash function, such as SHA-2, is used on the input strings. Such a function will cause approximately half of the bits to mismatch if even only one of the input bits mismatch.

In block 310, the user indicates to the devices 100/102 whether the resulting audio is harmonious or discordant. If the resulting audio is harmonious, the user indicates that the association is secure using any input means available on the devices 100/102. For example, the user in some embodiments operates a touch-screen display on each of the devices 100/102 to authenticate the association if the devices 100/102 are so equipped. Alternatively, in other embodiments, the user depresses an existing multi-function button to authenticate the association.

If the resulting audio is discordant, the user indicates that the association is not secure using any input means available on the devices 100/102. In some embodiments, when a secure association is not made, the user decides to repeat the process using a new key.

In the encoding function examples above, the bit-to-note encoding was identical for all voice-strings. This identical encoding increases the difficulty in perceiving the difference between two devices playing matching bit-strings, and one device playing a bit-string while the other device is silent. To remedy this difficulty, the encoding in some embodiments causes the voices of different devices to output distinct notes. The encoding function encodes the matching bits of different devices in such a manner that the user readily identifies whether one or two notes are being played simultaneously. The following are various embodiments for making distinct voices. Each of the embodiments may be used alone or combined with each other.

In one embodiment, the voice-string of the encoding function specifies a particular octave. For example, the minor second encoding is modified so that for voice-string 1 ($V_1$) the encoding remains 0=C4 and 1=C4#, but for voice-string 2 ($V_2$) the encoding is 0=C5 and 1=C5#, for voice-string 3 ($V_3$) the encoding is 0=C6 and 1=C6#, and so on. The embodiment of this encoding preserves the harmony\discord properties while making matching notes sound different from only one note being played by a single device.

In another embodiment, the user more easily identifies whether two notes are playing if the notes are not in unison. An example encoding illustrating this embodiment is where voice-string 1 ($V_1$) is 0=C4 and 1=A4# and voice-string 2 ($V_2$) is 0=E4 and 1=F4#. This encoding results in a major third for matching bits and a tritone for mismatching bits as shown in the table below:

| Bit-string 1 | 0 | 0 | 1 | 1 |
|---|---|---|---|---|
| Bit-string 2 | 0 | 1 | 0 | 1 |
| Voice-string 1 | C4 | C4 | A4# | A4# |
| Voice-string 2 | E4 | F4# | E4 | F4# |
| Interval | 4 (major 3rd) | 6 (tritone) | 6 (tritone) | 4 (major 3rd) |
| Harmonious/Discordant | H | D | D | H |

Although this example encoding makes it easier for the user to identify when only one note is being played, it may be more difficult for the user to notice mismatched bits since the difference between harmony (major third) and discord (tritone) is more subjective than the difference between unison and discord.

In yet another embodiment, the resulting audio is changed by altering the shape of the output waveform. There is a distinct difference between C4 played on a piano and C4 played on a harpsichord in part because these instruments produce differently-shaped waveforms. In this embodiment, the voice-string of the encoding function specifies the shape of the audio waveform. For example, simple waveform variations include sinusoidal, square, and triangle. These waveforms are simple to synthesize and sound quite distinct. More complex waveforms, such as simulating real-life instruments, could also be used.

The three preceding encoding embodiments cause matching bit-strings to sound somewhat more pleasant than mismatched bit-strings, but the sound of the matching bit-strings is not particularly musical. In particular, two bit-strings encoded with different voices produce only four distinct note combinations, and matching bit-strings will only produce two distinct note combinations. The resulting note sequences may still sound unpleasant to the user, potentially causing the user to disable the feature, avoid the product, or the like.

The devices 100/102 in some embodiments produce more desirable audio sequences by utilizing encoding functions that consider not only the value of each bit, but the position of the bit within the bit-string. For example, the encoding function specifies distinct encodings for the first bit of the string, for the second bit of the string, and so on. While the embodiments disclosed below specify encoding schemes for only a small number of bits, each scheme can be used to encode an arbitrarily long bit-string by encoding one portion of the longer bit string at a time, and concatenating the result.

In one embodiment, the encoding function employs position-dependent pitch variation to specify a note mapping for each bit in the sequence. The function of this embodiment is to make the pairing sound more interesting rather than only alternating two tones. An example of such an encoding is to map the first bit in a bit-stream as 0=C and 1=C#, and map the second bit as 0=D and 1=D#, and so on, which causes the devices to play a modified scale. Two examples of a longer mapping for a seven (7) bit sequence are: C\C# D\D# E\F F\F# G\G# A\A# B\C and C\C# B\C A\A# G\G# F\F# E\F D\D#.

In another embodiment, the encoding function employs position-dependent duration variation to specify the duration of the output notes. One example of this embodiment is for all notes to use the same duration. In this example, a short duration allows more notes for a given bit-stream to be played during a given time frame. The note duration is varied to make the sequence more interesting in another example of this embodiment. For example, the encoding could specify the duration of the notes as quarter note, quarter note, half note, quarter note, quarter note, half note, and so on.

In another example of this embodiment, note duration is dependent on both the bit value and the bit position; however, a mismatched bit will desynchronize the two sequences. Desynchronization is problematic because one sequence plays notes during rests in the other sequence, which is more difficult to detect than mismatched notes playing together. Further, desynchronization causes the user to mistake the desynchronization as the result of a timing error between the two devices and ignore it.

In yet another embodiment, the encoding function employs position-dependent rests to add rests to the output encoding. One example of this embodiment is to have no rests, which also has the advantage of compressing more notes for a given bit-stream into a given duration. Adding rests between some bit-positions makes the resulting composition more interesting. All of the position-dependent encoding techniques discussed above may be combined to make the output audio sequence more interesting.

In yet another embodiment, an arbitrary one-instrument musical tune is used as the starting note. In this embodiment, the encoding function maps a zero (0) bit to the existing note and maps a one (1) bit to the existing note plus or minus one (1) or six (6) semi-tone, thus producing a minor second or tritone. This mapping illustrates another unison\discord encoding. The resulting tune may not always sound appealing since only an all-zero bit-string will map to the original tune, but it will likely sound more interesting than the previous simple encodings.

A different authentication approach for device association is to encode bit-strings as on-off states of an LED. This encoding does not require multiple voices, since a user who watches the LEDs on both devices easily determines whether both are active or not. The most straight-forward encoding is to map a zero (0) in the bit-string to the off-state of the LED and a one (1) in the bit string to the on-state of the LED. The encoding function g (X)→L inputs a bit-string X and outputs a sequence of LED states. For two bit-strings $X_1$ and $X_2$, the resulting sequence of LED states $L_1$ and $L_2$ will be identical only if $X_1=X_2$.

Using the LED encoding function alone is straight-forward. The LEDs should blink through the encoded states. Matching bit-strings cause the LEDs to always both be on or both be off, whereas mismatches will cause one LED to be on and one LED to be off. Varying state-duration or adding rests between states is not necessary, but is nonetheless possible. When both an LED and audio output are available, the two functions can be used together. The approaches may either be combined in either a redundant mode, or a complementary mode.

In one embodiment, the LED and audio encodings are combined redundantly by giving both exactly the same bit string. In this embodiment, the LED state durations should match the note durations, and the LEDs should rest when the note sequence rests. As a result, the LEDs will match exactly when the notes match. This mode of operation allows the LEDs to reinforce the audio encoding. In case the user has difficulty distinguishing between matching and mismatching notes, such as when using the major third-tritone encoding, the LEDs are used both to double-check a particular note and to train the user to hear the difference between the matching and mismatching notes.

In another embodiment, the input bit string is split into two bit-strings: one is encoded as LED states and the other is encoded as audio. The two encodings are then played together. The advantage of this approach is that roughly double the number of bits are compared in a given time frame. However, the disconnect between the LED sequence and the audio sequence may confuse users.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A first computing device, comprising:
a transmitter;
a receiver;
a user interface configured to emit a human perceptible stimulus;
a memory in which command instructions are stored; and
a processor operably connected to the transmitter, receiver, user interface, and memory, and configured to execute the command instructions to:
form an association with a second computing device using the transmitter and the receiver,
compute a fingerprint of a common key derived during the association formation with the second computing device, and
control the user interface to emit a first audio stimulus, the first audio stimulus based upon the computed fingerprint, wherein the first audio stimulus is at least one octave number apart from a second audio stimulus emitted by the second computing device based upon the common key.

2. The first computing device of claim 1, wherein:
the transmitter is a wireless transmitter; and
the receiver is a wireless receiver.

3. The first computing device of claim 1, wherein the processor is further configured to execute the command instructions to emit the first audio stimulus simultaneously with emission of the second audio stimulus.

4. The first computing device of claim 1, wherein the processor is further configured to execute the command instructions to control emission of the first audio stimulus at a semitone interval with the second audio stimulus when the computed fingerprint is not identical to a computed finger print of the second computing device such that the first audio stimulus and the second audio stimulus produce a minor second.

5. The first computing device of claim 1, wherein the processor is further configured to execute the command instructions to control emission of the first audio stimulus at a semitone interval with the second audio stimulus when the computed fingerprint is not identical to a computed finger print of the second computing device such that the first audio stimulus and the second audio stimulus produce a tritone.

6. The first computing device of claim 1, wherein the processor is further configured to execute the command instructions to:
apply a one-way collision resistant hash function to the computed fingerprint; and
control the user interface to emit the first audio stimulus in the form of a sequence of notes based upon the applied hash function.

7. The first computing device of claim 1, wherein the processor is further configured to execute the command instructions to:
exchange timing information with the second computing device to enable synchronized emission of the first audio stimulus and the second audio stimulus.

8. The first computing device of claim 1, wherein the processor is further configured to execute the command instructions to:
control the user interface to emit the first audio stimulus in a waveform having a shape different from a waveform of the second audio stimulus.

9. The first computing device of claim 1, wherein the first audio stimulus is the same note as the second audio stimulus when the computed fingerprint is identical to a computed finger print of the second computing device.

10. A method to allow authorization of computing device association using human-perceptible signals, comprising:
forming an association between a first computing device and a second computing device;
computing with the first computing device a fingerprint of a common key derived during forming of the association; and
emitting with the first computing device a first audio stimulus, the first audio stimulus based upon the computed fingerprint, the first audio stimulus at least one octave number apart from a second audio stimulus of the second computing device emitted by the second computing device based upon the common key.

11. The method of claim 10, wherein the association is formed using a wireless network.

12. The method of claim 10, wherein the first audio stimulus is emitted simultaneously with emission of the second audio stimulus.

13. The method of claim 10, wherein the first audio stimulus is emitted at a semitone interval with the second audio stimulus when the computed fingerprint is not identical to a computed finger print of the second computing device such that the first audio stimulus and the second audio stimulus produce a minor second.

14. The method of claim 10, wherein the first audio stimulus is emitted at a semitone interval with the second audio stimulus when the computed fingerprint is not identical to a computed finger print of the second computing device such that the first audio stimulus and the second audio stimulus produce a tritone.

15. The method of claim 10, further comprising:
applying a one-way collision resistant hash function to the computed fingerprint with the first computing device, wherein the first audio stimulus is emitted in the form of a sequence of notes based upon the applied hash function.

16. The method of claim 10, further comprising:
exchanging timing information between the first computing device and the second computing device; and
synchronizing emission of the first audio stimulus and the second audio stimulus using the exchanged timing information.

17. The method of claim 10, wherein the first audio stimulus is emitted in a waveform having a shape different from a waveform of the second audio stimulus.

18. The method of claim 10, wherein the first audio stimulus is the same note as the second audio stimulus when the computed fingerprint is identical to a computed finger print of the second computing device.

19. The first computing device of claim 1, wherein:
the processor is further configured to execute the command instructions to implement an encoding function that inputs the fingerprint and a voice-string; and
the first audio stimulus comprises an output of the encoding function in the form of a sequence of audio signals.

20. The first computing device of claim 19, wherein:
the fingerprint comprises a shortened sequence of bits indicative of the common key;
the bits comprise a zero bit or a one bit at each bit position in the sequence of bits; and
the voice-string is a predetermined audio signal mapped on each zero bit or one bit at the respective bit positions.

* * * * *